United States I

[11] 3,619,031

| | | |
|---|---|---|
| [72] | Inventor | Juan Jose Amodei, Levittown, Pa. |
| [21] | Appl. No. | 15,009 |
| [22] | Filed | Feb. 27, 1970 |
| [45] | Patented | Nov. 9, 1971 |
| [73] | Assignee | RCA Corporation |

[54] ELECTRO-OPTIC PARITY CHECKER
3 Claims, 3 Drawing Figs.

[52] U.S. Cl. .......... 350/150, 340/173 SS, 350/157

[51] Int. Cl. .......... G02f 1/26

[50] Field of Search .......... 350/149, 150, 157, 160, DIG. 2; 340/173 LT, 173 SS, 173

[56] References Cited

UNITED STATES PATENTS

| | | | |
|---|---|---|---|
| 3,407,017 | 10/1968 | Fleisher et al. | 350/150 |
| 3,342,539 | 9/1967 | Nelson et al. | 350/150 |
| 3,439,348 | 4/1969 | Harris et al. | 350/157 X |
| 3,466,433 | 9/1969 | Duda et al. | 350/150 X |
| 3,407,405 | 10/1968 | Hoadley | 340/173 LT |
| 3,532,033 | 10/1970 | Chang | 350/157 UX |

*Primary Examiner*—David Schonberg
*Assistant Examiner*—Paul R. Miller
*Attorney*—H. Christoffersen

ABSTRACT: A parity checker is disclosed in which electrical signals representing "1" and "0" bits of an information word are supplied to optically aligned electro-optic polarization rotators. A polarized light beam directed through the rotators is rotated 90° an odd or an even number of times depending on whether there are an odd or an even number of 1's in the information word. An analyzer and a light detector receptive to the rotated beam provides an electrical indication of the parity of the information word.

INVENTOR.
Juan J. Amodei
BY
Carl V. Olson
ATTORNEY

ELECTRO-OPTIC PARITY CHECKER

BACKGROUND OF THE INVENTION

Computer and data processing systems commonly utilize information words which include a parity bit. The parity of the information bits is checked, and the parity bit is made to be a 1 or a 0 in order that the entire word will have a predetermined parity, such as an even number of 1 S. Then, at a following point in the system, the parity of the word is checked to determine whether the parity has changed as the result of the occurrence of an error. Parity checking is conventionally accomplished by electronic logic circuits which are either complex and therefore expensive, or else are relatively slow in operation. It is therefore an object of this invention to provide an improved parity checker which operates substantially instantaneously in determining the parity of an information word. The parity checker may be used for both the generation of an appropriate parity bit, and for the detection of a parity error.

SUMMARY OF THE INVENTION

Means are provided to condition a plurality of polarization rotators in accordance with the binary bits of an information word, and to sense the presence or absence of a net change in the polarization of a light beam passed serially through the rotators.

DESCRIPTION OF THE PREFERRED EMBODIMENT

Figure 1:
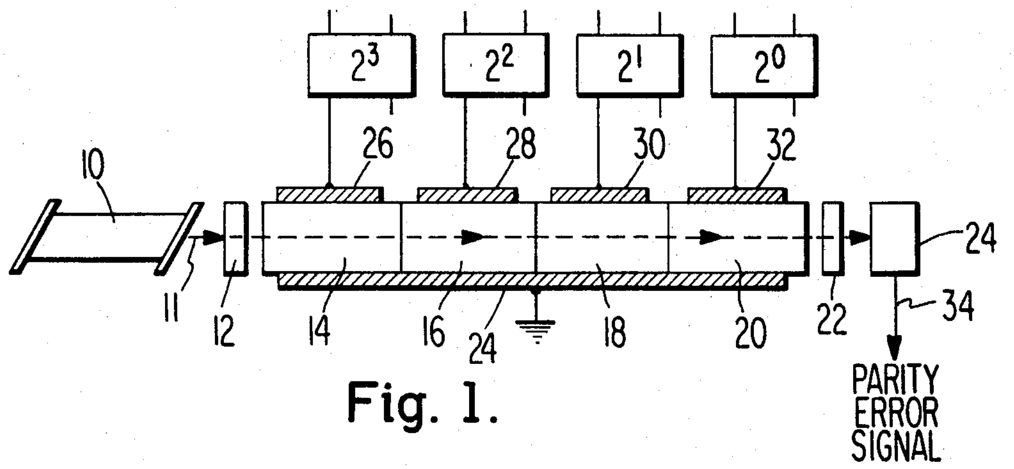
FIG. 1 is a diagram of a parity-checking system embodying the invention.

Referring now in greater detail to FIG. 1, there is shown a light path including, in the order named, a laser 10, a polarizer 12, a plurality of electro-optic crystals 14, 16, 18 and 20, an analyzer 22 and a light detector 24. The crystals 14, 16, 18 and 20 are provided with a common electrode 24 connected to a point of reference potential. The crystals 14, 16, 18 and 20 are also provided with individual electrodes 26, 28, 30 and 32, respectively. The individual electrodes are connected by respective electrical conductors to the respective outputs of flip-flops $2^3$, $2^2$, $2^1$ and $2^0$.

The laser 10 may be any suitable laser providing a beam 11 of monochromatic light. The polarizer 12 is a conventional known optical element which passes solely the portion of the incident light beam which is polarized in a predetermined specific direction.

The electro-optic crystals 14, 16, 18 and 20 are known optical elements having a dimension in the direction of the optical path which provides a 90° rotation of the polarization of the light passing therethrough when the electrodes at opposite faces of the crystal are supplied with a suitable electrical voltage. Different known crystal materials require different known voltages for their operation as polarization rotators. A particularly desirable material is barium strontium niobate which operates as a polarization rotator when about 47 volts are applied across the electrodes. Other crystal materials may be less attractive for use because they may require up to thousands of volts for their operation. It is expected that new materials will become available which require even less than 47 volts for their operation.

The analyzer 22 is a well-known optical element which is similar to the polarizer 12 in that it passes light having solely one predetermined direction of polarization. The light detector 24 may be any suitable known device which responds to incident light by generating an electrical signal on the output line 34.

In the operation of the parity checker of FIG. 1, the flip-flops $2_3$ through $2_0$ are assumed to be in states representing the storage of 1 or 0 binary bits of an information word. The flip-flops containing a 1 supply a given output voltage to the electrodes of the corresponding electro-optic polarization rotator to cause a 90° rotation of the polarization of the light beam passing therethrough. On the other hand, the flip-flops containing a 0 supply a zero voltage to the corresponding polarization rotators so that the rotators do not rotate the light beam passing therethrough.

When the light beam from laser 10 is directed along the light beam path 11 to the light detector 24, the light beam is rotated 90° in each polarization rotating crystal to which 1 electrical signal is applied. The analyzer 22 is oriented in relation to the polarizer 12 in accordance with whether the system is desired to detect odd or even parity in the information word. If a valid word is considered to be one containing an even number of 1's, the analyzer 22 is positioned to pass light which is polarized at right angles to the direction of polarized light passed by the polarizer 12. If a single one of the polarization rotating crystals is energized by a 1 signal, the once-rotated beam passes through the analyzer 22 and generates in light detector 24 a parity error indicating signal on output line 34. This is because a single 1 bit is an odd number of 1's, instead of the even number assumed to be required for an error-free information word.

If two of the polarization rotators are energized with 1 signals, the light beam is rotated 90° by one of the rotators and is rotated an additional 90° by the other rotator so that the light beam reaching the analyzer 22 has the same polarization as the light beam supplied from the polarizer 12. Light having this polarization is blocked by the analyzer 22, and the light detector 24 appropriately does not generate a parity error signal. It is seen that whenever an odd number of 1's are present in the flip-flops, a parity error signal is generated. On the other hand whenever the flip-flops contain an even number of 1's, there is no parity error signal generated.

The system illustrated in FIG. 1 with an information word of four bits may, of course, be extended to include a greater number, such as 72, of information bits. THe generation of a parity error signal, if there is a parity error in the information word, occurs almost instantaneously because of the speed at which light traverses the optical path. The system embodying the invention is therefore much faster in operation than prior arrangements utilizing electronic circuits which must operate sequentially in calculating the parity of the information word.

Figure 2:
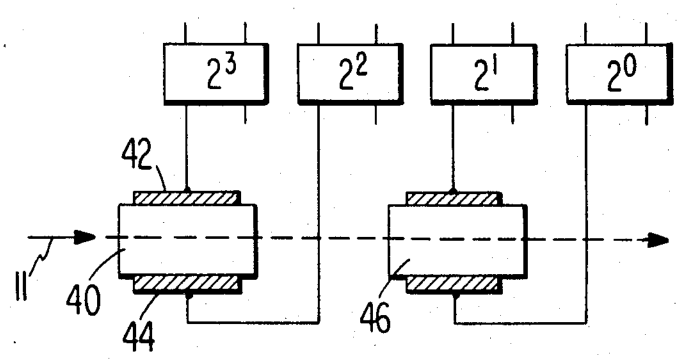
FIG. 2 is a diagram of a portion of a parity checker differing from that of FIG. 1 in requiring fewer electro-optic crystals.

FIG. 2 shows an alternative arrangement of a portion of the parity-checking system shown in FIG. 1. The arrangement of FIG. 2 requires only one polarization rotator for each pair of binary information bits. The electro-optic crystal 40 includes an electrode 42 connected to the output of flip-flop $2^3$ and includes electrode 44 connected to the output of flip-flop $2^2$. Electro-optic crystal 46 is similarly connected to outputs of flip-flops $2^1$ and $2^0$. The electro-optic crystals 40 and 46 are similar to the crystals shown IN FIG. 1 in that they are preferably made of barium strontium niobate oriented and provided with electrodes to operate in the transverse electro-optic mode.

In the operation of the parity checker of FIG. 2, the electro-optic crystal 40 responds to the parity of the pair of information bits in the flip-flops $2^3$ and $2^2$. That is, rotator 40 provides a 90° rotation of the light beam when the two flip-flops contain different information bits (solely one of the flip-flops contains a 1 information bit). Rotator 40 provides no rotation of the light beam when the two flip-flops contain the same information bits, that is, both 1's or both 0's. The polarization rotator 46 acts in a similar manner in relation to the information bits in flip-flops $2^1$ and $2^0$. Thus, each of crystals 40 and 46 calculates the parity of one pair of bits of the word and rotates the polarization by 90° if the parity of a pair is odd, and does not rotate the beam if the parity of a pair is even. Therefore, an even number of odd pairs results in a zero net rotation at the output. On the other hand, an odd number of odd pairs results in one net 90° rotation. The system of FIG. 2 correctly determines the parity of the complete information word with half the number of crystals required in the system of FIG. 1 where each crystal is returned to a common reference point.

Figure 3:
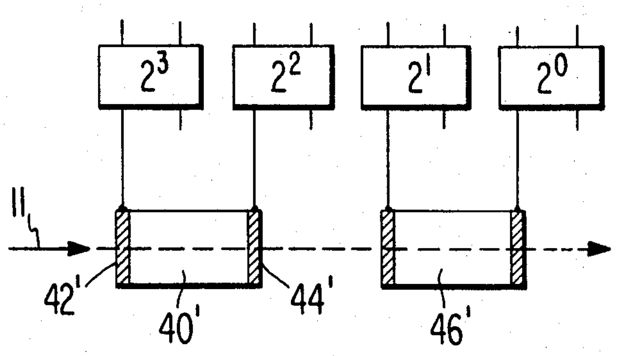
FIG. 3 is a portion of a parity checker differing from the one of FIG. 2 in utilizing a longitudinal electro-optic effect.

FIG. 3 is similar to FIG. 2 but differs therefrom in that a longitudinal electro-optic effect is utilized. Crystal 40' is provided with optically transparent electrodes 42' and 44' through which the light beam 11 passes. A suitable crystal material for this mode of operation is barium sodium niobate. In other respects the construction and operation are the same as have been described.

What is claimed is:

1. A parity checker, comprising a polarizer, a plurality of 90° polarization rotators each including an electro-optic crystal provided with electrodes, an analyzer and a light detector, all arranged in sequence along an optical path, a plurality of sources of binary electrical signals, representing the 1 and 0 types of bits of an information word, connected to electrodes of said electro-optic crystals, whereby each said crystal receiving a bit signal of one-type impressed thereacross is conditioned to cause a 90° rotation of the polarization of a light beam transmitted therethrough, and means to direct a monochromatic light beam through said optical path, whereby said light detector provides an output indicating whether or not there is an even number or an odd number of bit signals of said one-type in said information word.

2. The combination of claim 1 wherein each of said electrical signal sources is connected across a respective one of said plurality of electro-optic crystals.

3. The combination of claim 1 wherein each of said electro-optic crystals has one electrode connected to one of said electrical signal sources and has the other electrode connected to a different one of said electrical signal sources, whereby the necessary number of crystals is halved.

* * * * *